United States Patent [19]

Sakai

[11] Patent Number: 5,163,880
[45] Date of Patent: Nov. 17, 1992

[54] REVOLUTION SPEED CONTROLLER FOR CONTINUOUSLY VARIABLE SPEED TRANSMISSION

[75] Inventor: Yoshitaka Sakai, Nagoya, Japan

[73] Assignee: Sakai Manufacturing Co., Ltd., Japan

[21] Appl. No.: 765,250

[22] Filed: Sep. 25, 1991

[30] Foreign Application Priority Data

Sep. 28, 1990 [JP] Japan .................................. 2-261490
Oct. 25, 1990 [JP] Japan ............................ 2-112578[U]

[51] Int. Cl.⁵ ............................................. F16H 59/00
[52] U.S. Cl. ......................................... 474/28; 474/69
[58] Field of Search ................... 474/8, 11, 12, 17, 18, 474/28, 69, 70; 74/867, 868

[56] References Cited

U.S. PATENT DOCUMENTS 4,778,435 10/1988 Sugaya et al. ......................... 474/28
5,094,129 3/1992 Sugaya et al. .................... 474/11 X Primary Examiner—Thuy M. Bui
Attorney, Agent, or Firm—Pollock, Vande Sande & Priddy

[57] ABSTRACT

A revolution speed controller for a continuously variable speed transmission has an air cylinder unit for operating a speed-control section of the transmission, and a command pressure chamber partly defined by a diaphragm operable in response to a command air pressure. The diaphragm and the air cylinder unit are connected by a resilient member. A valve member is movable in response to operation of the diaphragm to connect or disconnect a working air pressure source to or from the interior of the air cylinder unit and to disconnect or connect the interior of the air cylinder unit from or to the atmosphere. When the pressure in the command pressure chamber is balanced with a force exerted to the diaphragm by the resilient member, the valve member cuts off the supply of the working air pressure to the air cylinder unit and also interrupts the communication between the air cylinder unit and the atmosphere.

8 Claims, 5 Drawing Sheets

REVOLUTION SPEED CONTROLLER FOR CONTINUOUSLY VARIABLE SPEED TRANSMISSION

FIELD OF THE INVENTION

The present invention relates to a revolution speed (RPM) controller in which air pressure is utilized to operate a speed-control section of a continuously variable speed transmission.

DESCRIPTION OF THE PRIOR ART

When continuously variable speed transmissions are employed in industrial machines, mechanical remote control is difficult to perform if the installation place of a continuously variable speed transmission and the position to control the transmission are far distanced, as in the case of controlling a continuously variable speed transmission remotely situated from one control room, as in the case of an increased size of the machine, or as in the case of a continuously variable speed transmission disposed at an elevated level. In particular, it has been impossible to automatically perform speed-changing control from a far distant place by a speed change system. In the past, remote control of continuously variable speed transmissions has been carried out in such a manner that a handle for operating a continuously variable speed transmission to control speed is rotated by a pilot motor, an electric generator is provided on the output side, and a comparison circuit is connected between the motor and the generator.

The prior art circuit using the pilot motor has suffered from such problems as requiring a long speed-changing time, allowing no adjustment of accelerating and decelerating times, being impossible to frequently change the speed because of on/off control of the motor, increase in the size of the entire transmission system and in the production cost, and inclusion of members to be worn.

SUMMARY OF THE INVENTION

A primary object of the present invention is to provide a revolution speed (RPM) controller in which air pressure is solely utilized to operate a speed-control section of a continuously variable speed transmission.

Another object of the present invention is to provide a revolution speed (RPM) controller in which air pressure is solely utilized to perform automatic remote control.

Still another object of the present invention is to provide a revolution speed (RPM) controller which has a reduced fluctuation in revolution due to load fluctuation of a continuously variable speed transmission A further object of the present invention is to provide a revolution speed (RPM) controller for a continuously variable speed transmission which can reduce the entire size.

According to the present invention, there is provided a revolution speed controller for a continuously variable speed transmission, comprising a pneumatic cylinder unit for operating a speed-control section of the continuously variable speed transmission and a command pressure chamber partially defined by a diaphragm operable in response to a command air pressure. The command pressure chamber is provided with a command air pressure supply hole to receive the command air pressure therethrough. A working air chamber is provided which communicates with the interior of the air cylinder unit, the working air chamber being provided with a working air supply hole to receive working air for operating the air cylinder unit, and with a passage for communicating the working air chamber with the atmosphere. A resilient member connects the diaphragm to the pneumatic cylinder unit. A valve member is responsive to operation of the diaphragm to open and close the working air supply hole and to open and close the passage. The valve member is arranged to close the working air supply hole and also close the passage when a force applied to the diaphragm by the command air pressure in the command pressure chamber is balanced with a force exerted by the resilient member to the diaphragm.

With the present invention, the revolution speed of the continuously variable speed transmission can be changed by varying the command air pressure, so that a speed-control operation and a speed-change instruction can be made from a location far remote from the continuously variable speed transmission. Further, since fluctuation of the air pressure due to load fluctuations are absorbed by a balance between the pressure in the command pressure chamber and the force exerted by the resilient member to thereby automatically compensate the air pressure fluctuation, i.e., restoring the diaphragm to its original position, any fluctuation in revolution speed due to a load fluctuation of the continuously variable speed transmission is very small to provide a highly accurate control of the revolution speed. In addition, the controller can be reduced in its entire size because of the foregoing arrangement.

Another advantage is that the utilization of air pressure makes it possible to freely set a speed changing time for easy and vast compatibility with advanced automatic control technology, and enable a single controller to control two or more continuously variable speed transmissions.

Moreover, since the structure of the controller of the invention is free from failures and can provide a continuous automatic control, the controller is well suited for future computerization in the industries.

The above objects, features and advantages will be made more apparent by the following description with reference to the accompanying drawings.

DESCRIPTION OF PREFERRED EMBODIMENTS

Figure 1:
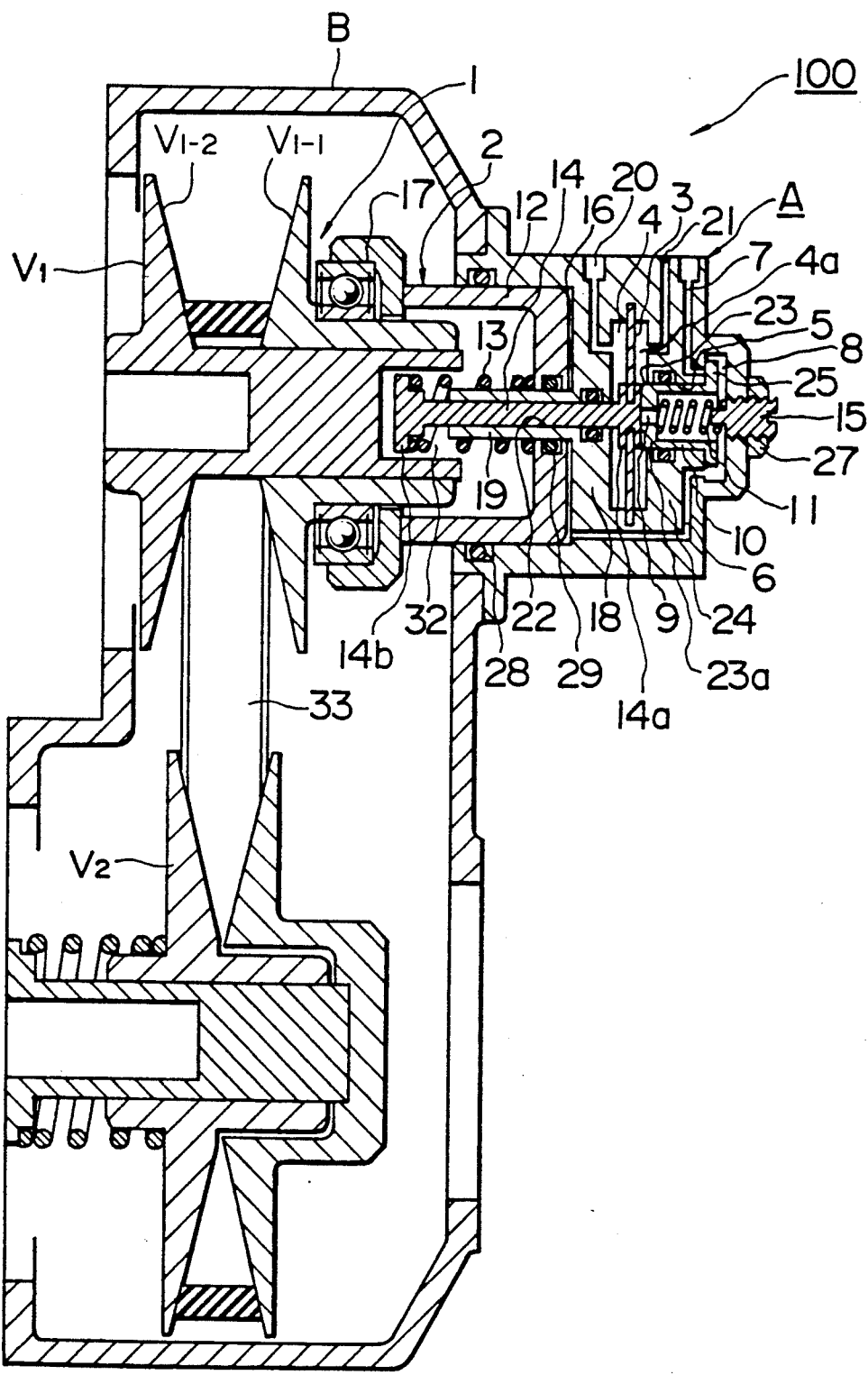
FIG. 1 is a sectional view of a continuously variable speed transmission equipped with a revolution speed controller according to one embodiment of the present invention, showing a low-speed condition thereof.

Referring to FIGS. 1 to 4, a belt type continuously variable speed transmission 100 comprises an input-V pulley V1 disposed in a casing B, an output V pulley V2 also disposed in the casing B, and a revolution speed controller A mounted in the casing B. A V belt 33 extends around the input V pulley V1 and the output V pulley V2. As in the prior art, the revolution speed of the output V pulley V2 is changed by moving a movable conical plate V1-1 of the input V pulley V1 toward and away from a stationary conical plate V1-2 thereof. The movable conical plate V1-1 of the input V pulley V1 constitutes a speed-control section 1.

The revolution speed controller A includes a pneumatic cylinder unit 2 for operating the speed-control section 1. A piston 12 of the cylinder unit 2 is coupled to the speed-control section 1 via a bearing 17. The cylinder unit 2 has a cylinder bore 16 and a command pressure chamber 4 separated therefrom by a partition wall 18. The command pressure chamber 4 is partially defined by a diaphragm 3 operable in response to a command pressure. The command pressure chamber 4 is provided with a command air pressure supply hole 20 so as to receive a variable command air pressure from an external conduit (not shown). Another chamber 4a is defined on the side of the diaphragm 3 opposite to the command pressure chamber 4. The chamber 4a is communicating with the atmosphere via an air discharge hole 21. A joint pin 14 is connected at one end to the center of the diaphragm 3. The joint pin 14 slidably extends through a hole 22 extending through a hollow shaft 19 provided on and extending from the partition wall 18. The hollow shaft 19 slidably passes through a hole 12a (see FIG. 3) formed in an end wall of the piston 12. The joint pin 14 has the other end 14b located on the side of the piston 12 opposite to the diaphragm 13. The other end 14b of the joint pin 14 is shaped to have a large-diameter portion. A resilient member 13 in the form of a compression coil spring is disposed and extends between the large-diameter portion of the joint pin end 14b and the end wall of the piston 12. A partition wall 24 partially defining the chamber 4a has a cylindrical hole 5 formed therein, and communicating a working air chamber 8 with the chamber 4a. The working air chamber 8 is partially defined by an annular shoulder 26 extending radially outwardly from the cylindrical hole 5. The working air chamber 8 is provided with a working air supply hole 7 to receive working air pressure via an external conduit (not shown). The working air supply hole 7 is opened in the annular shoulder 26 and to the working air chamber 8. The working air chamber 8 is communicated with the cylinder bore 16 via a communication passage 6. A valve seat 23 is provided at the center of the side of the diaphragm 3 adjacent to the chamber 4a. A hollow, tubular valve body 10 slidably extends through the cylindrical hole 5. The valve body 10 is provided at one axial end thereof with a valve face 23a cooperating with the valve seat 23. At the center of the valve face 23a. there is formed a discharge hole 9 communicating with a hollow portion 9a of the valve body 10. In this manner, the discharge hole 9 is opened and closed by the valve seat 23. The hollow portion 9a of the valve body 10 is communicating with the working air chamber 8. The valve body 10 is provided at the other axial end thereof with a flange 25 extending radially outwardly. The flange 25 can be brought into abutment with the annular shoulder 26 so that the opening of the working air supply hole 7 to the chamber 8 is opened and closed. A resilient member 11 in the form of a compression coil spring is disposed in the hollow portion 9a of the valve body 10, so that a pressing force is exerted to the valve body 10 to normally urge the valve face 23a against the valve seat 23 and also the flange 25 against the annular shoulder 26. The resilient member 11 has one end supported by and engaged with an adjust screw 15. The adjust screw 15 is held at an adjusted position determined by a nut 27. Incidentally, reference numerals 28, 29, 30 and 31 represent sealing members which serve to prevent leakage of the air pressure. Numeral 32 (see FIG. 1) denotes a recessed hole formed in the axial end of the stationary conical plate V1-2 of the input V pulley V1 for avoiding an interference between the shaft of the plate V1-2 and the end 14b of the joint pin 14.

Operation of this embodiment will be explained below. The working air pressure is always supplied to the working air supply hole 7 via a conduit (not shown). Also, a variable command air pressure is supplied to the command air pressure supply hole 20 via a conduit (not shown).

Figure 2:
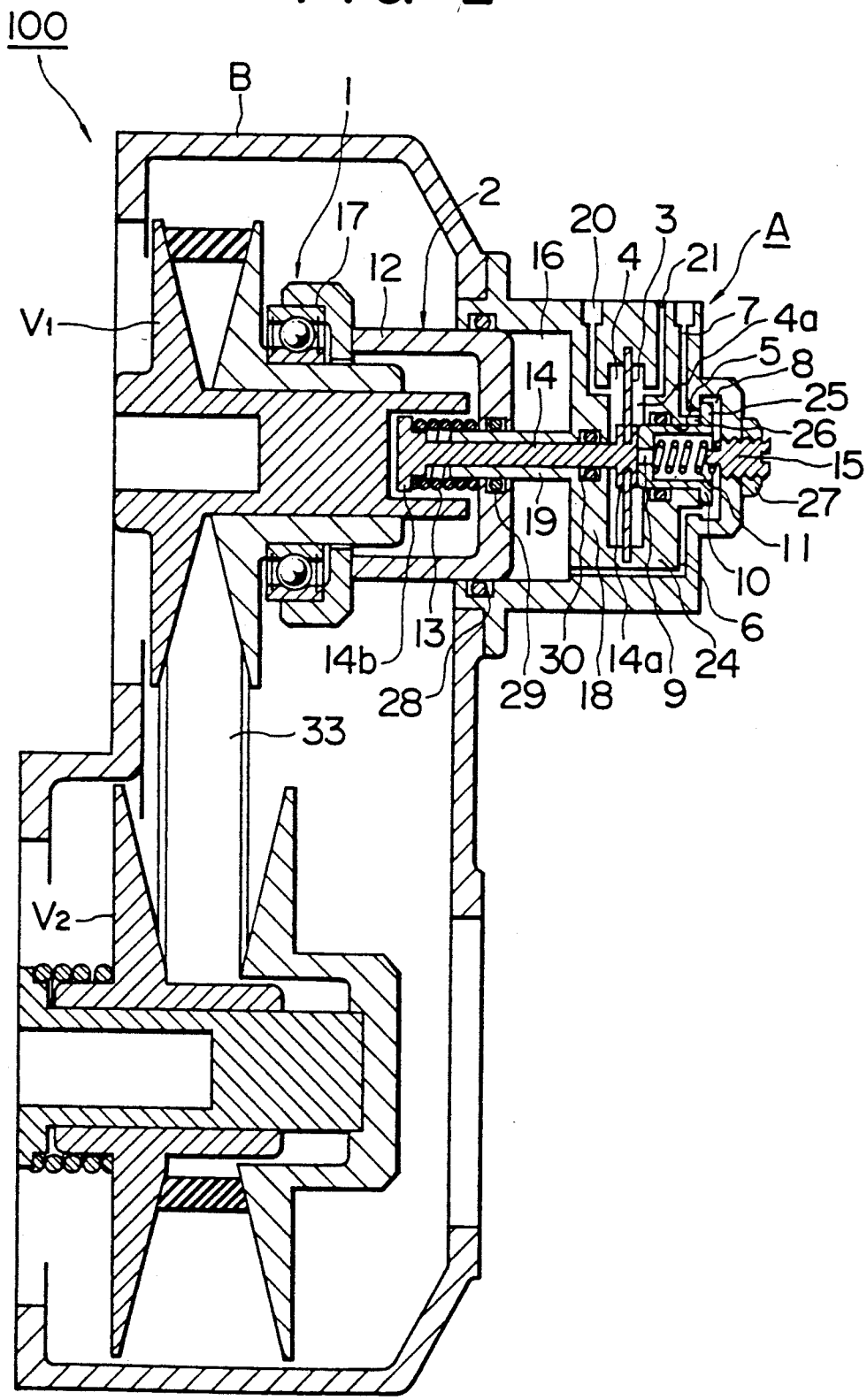
FIG. 2 is a sectional view of the continuously variable speed transmission equipped with the revolution speed controller according to the embodiment of FIG. 1, showing a high-speed condition thereof.
Figure 3:
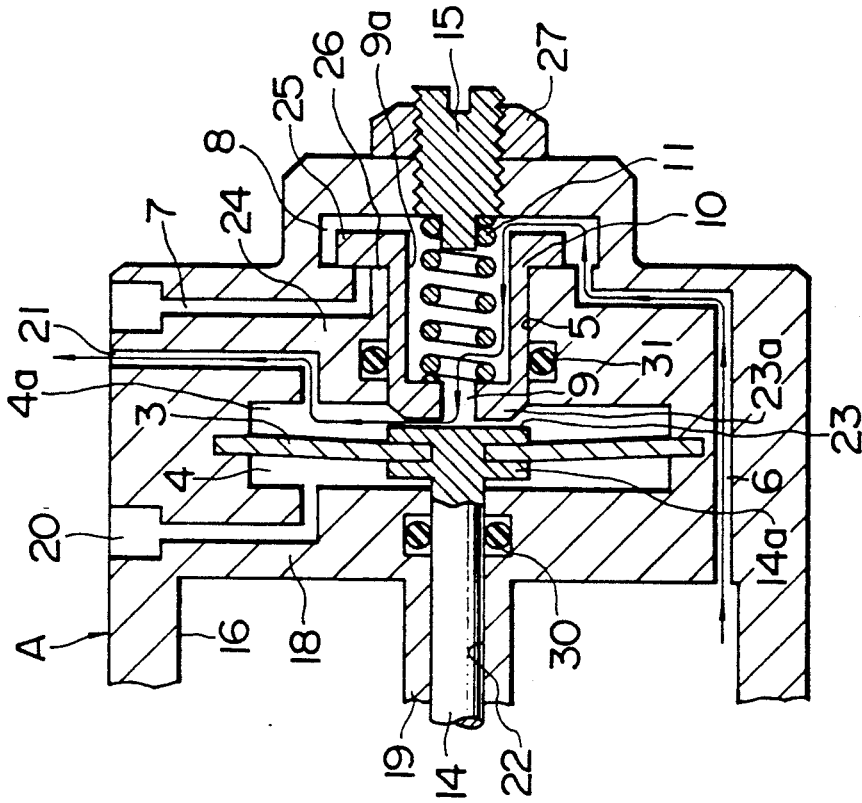
FIG. 3 is an enlarged partial sectional view showing a condition in which a command pressure chamber of the embodiment of FIG. 1 is pressurized.

When it is intended to shift the speed-control section 1 from a low-speed position shown in FIG. 1 to a high-speed position shown in FIG. 2, the command air pressure at a desired high level is supplied to the command air pressure supply hole 20. The air pressure introduced into the command pressure chamber 4 moves the central portion of the diaphragm 3 to the right as shown in FIG. 3. The valve seat 23 is brought into abutment with the valve 23a to move the valve body 10 against the resilient member 11. The flange 25 is thereby moved away from the annular shoulder 26, so that the working air flows into the working air chamber 8 from the working air supply hole 7 (as indicated by arrows in FIG. 3). The working air further flows into the cylinder bore 16 via the communication passage 6 (as indicated by arrows in FIG. 3) to move the piston 12 to the left against the resilient member 13. Thus, the piston 12 moves the speed-control section 1 to the left for bringing the continuously variable speed transmission 100 into the high-speed position. As the piston 12 is moved to the left, the force applied by the resilient member 13 to the diaphragm 3 is gradually increased until the force applied by the resilient member 13 is balanced with the force exerted to the diaphragm 3 by the command air pressure in the command pressure chamber 4. When such a balanced condition is reached, the central portion of the diaphragm 3 restores to its original central or straight position. In this position, the valve body 10 is moved by the resilient member 11 to the left so that the flange 25 is brought into abutment with the annular shoulder 26 to interrupt the introduction of the working air into the working air chamber 8. Accordingly, no working air now flows into the cylinder bore 16 from the working air chamber 8 via the communication passage 6. In this way, the speed-control section 1 of the continuously variable speed transmission 100 is adjusted to the high-speed position corresponding to the increased command air pressure.

Figure 4:
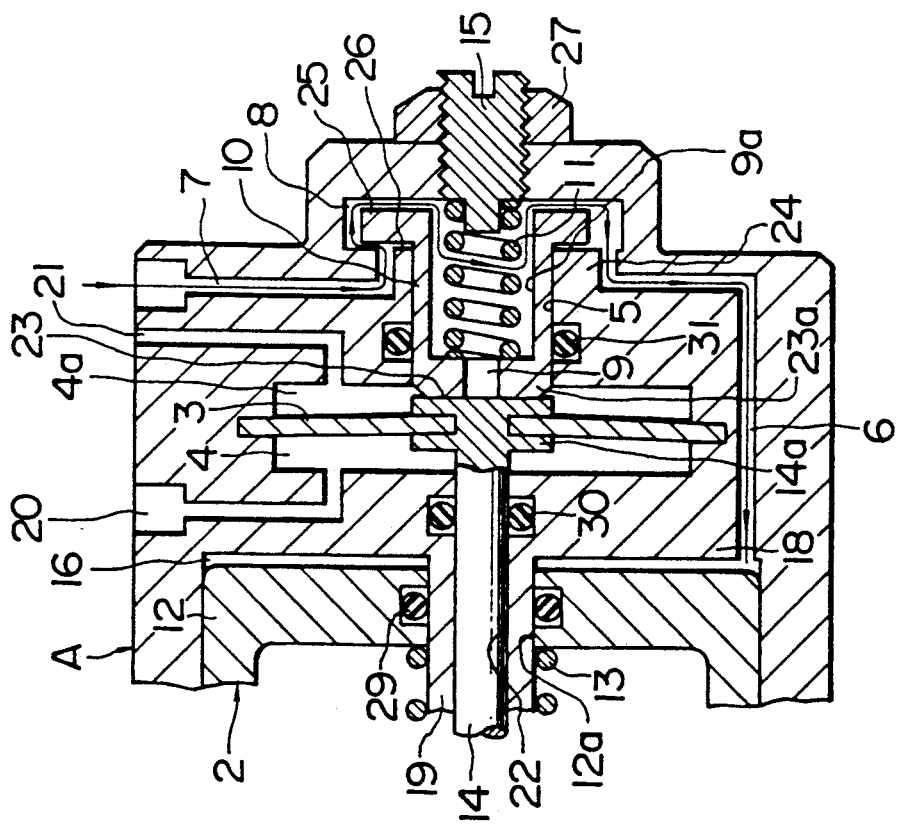
FIG. 4 is an enlarged partial sectional view showing a condition in which the command pressure chamber of the embodiment of FIG. 1 is depressurized 1.

Next, when it is intended to shift the speed-control section 1 from the high-speed position shown in FIG. 2 to the low-speed position shown in FIG. 1, the command air pressure is lowered to a desired low level and is supplied to the command air pressure supply hole 20. Thus, the central portion of the diaphragm 3 is moved to the left as shown in FIG. 4. The valve seat 23 is thereby disengaged from the valve face 23a of the valve body 10 to open the discharge hole 9. This causes the working air in the cylinder bore 16 to be discharged to the atmosphere via the communication passage 6, the working air chamber 8, the hollow portion 9a of the valve body 10, the discharge hole 9, the chamber 4a and the air discharge hole 21 as indicated by arrows in FIG. 4. The piston 12 is thus moved to the right and so is the controlled speed-control section 1, thereby bringing the continuously variable speed transmission 100 into the low-speed position. As the piston 12 is moved to the right, the force applied by the resilient member 13 to the diaphragm 3 is gradually decreased until the force applied by the resilient member 13 is balanced with the force exerted by the command air pressure in the command pressure chamber 4 to the diaphragm 3. When such a balanced condition is reached, the central portion of the diaphragm 3 restores to its original central or straight position. In this position, the valve face 23a is brought into abutment with the valve seat 23 to close the discharge hole 9. Accordingly, no working air now flows out from the cylinder bore 16 via the discharge hole 9. In this way, the speed-control section 1 of the continuously variable speed transmission 100 is adjusted to the low-speed position corresponding to the lowered command air pressure.

A description will now be made of the case where the continuously variable speed transmission 100 is subjected to load fluctuations or variations. When load fluctuations occur, the piston 12 is displaced to the left or right by a cushioning action of the working air in the cylinder bore 16. The resilient member 13 exerts a correspondingly increased or decreased force to the diaphragm 3. The central portion of the diaphragm 3 is thereby displaced to the left or right so that the working air is discharged from or introduced into the cylinder bore 16 until the command air pressure in the command pressure chamber 4 and the force applied by the resilient member 13 are eventually balanced with each other. In this way, even if the continuously variable speed transmission 100 is decelerated or accelerated due to load fluctuations, this deceleration or acceleration is automatically compensated so that the revolution speed of the output pulley of the continuously variable speed transmission 100 is controlled depending only on the desired command air pressure.

The adjust screw 15 serves to adjust the spring pressure of the resilient member 11. When the adjust screw 15 is loosened, the spring pressure of the resilient member 11 is lowered, allowing the valve body 10 to open the working air pressure supply hole 7 at a pressure lower than the command air pressure in the command pressure chamber 4. In an attempt to control a plurality of continuously variable speed transmissions by a command air pressure from a single command air pressure source, the revolution speeds of those continuously variable speed transmissions are required to be set to slightly higher values than standard ones. Such a requirement can be met by adjustment of the spring force of the resilient member 11 by the adjust screw 15.

Figure 5:
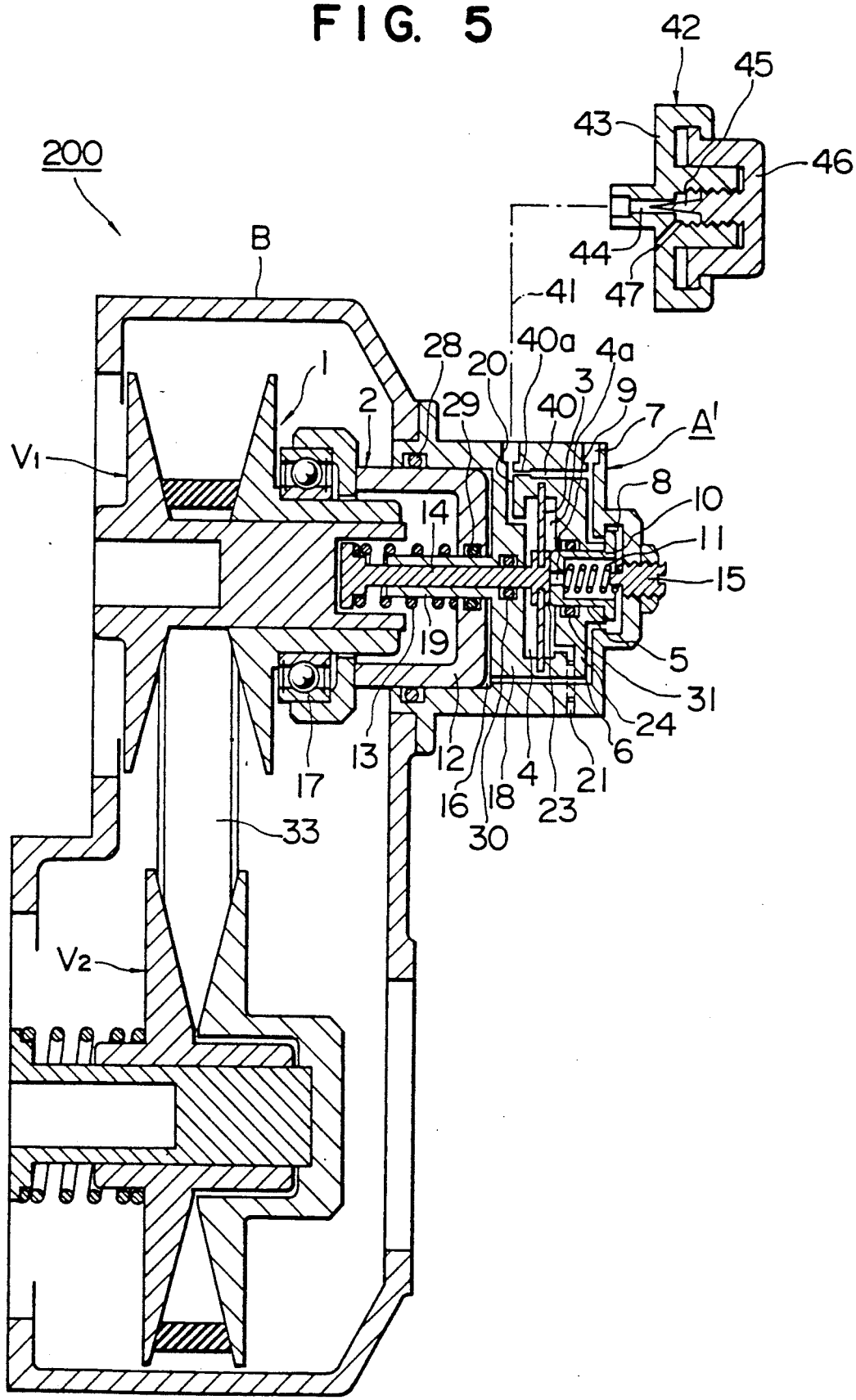
FIG. 5 is a sectional view of a continuously variable speed transmission equipped with a revolution speed controller according to another embodiment of the present invention, showing a low-speed condition thereof.
Figure 6:
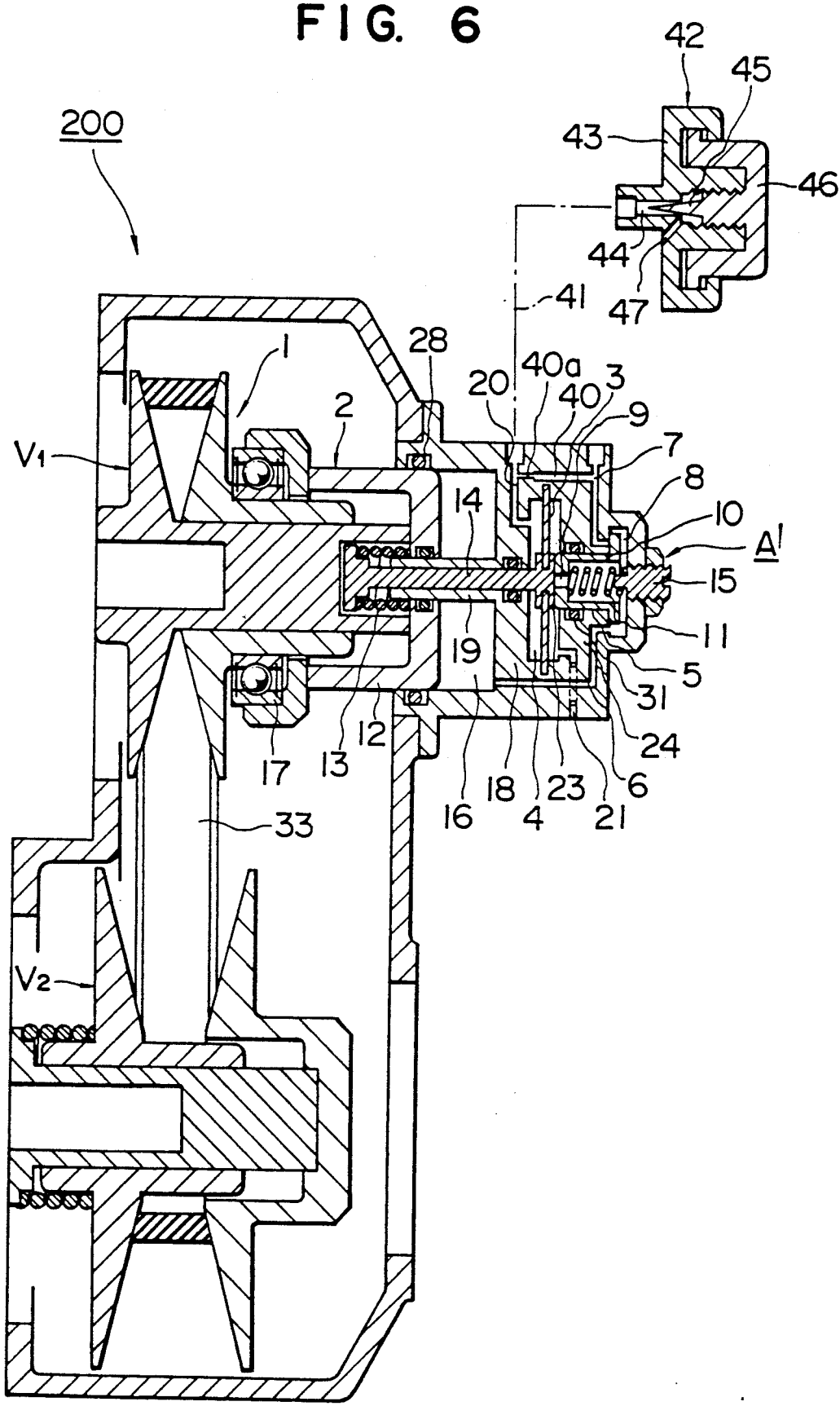
FIG. 6 is a sectional view of the continuously variable speed transmission equipped with the revolution speed controller according to the another embodiment of FIG. 5, showing a high-speed condition thereof.

In a revolution speed controller A' of a continuously variable speed transmission 200 shown in FIGS. 5 and 6 which is another embodiment of the present invention, the same reference numerals as those in FIGS. 1 to 4 denote the same or identical components.

This other embodiment is different from the preceding embodiment in the following points:

Between the working air supply hole 7 and the command air pressure supply hole 20, there is provided a communication hole 40 through which the working air pressure flows and is lowered so as to be utilized as the command air pressure. The communication hole 40 is provided with a restriction orifice 40a near a position where the hole 40 is connected to the command air pressure supply hole 20. The command air pressure supply hole 20 is communicated with a discharge throttle valve 42 via a connecting pipe 41. The discharge throttle valve 42 comprises a base body 43 and a handle 46 provided at the distal end thereof with a needle valve 45 which is movable into and out of an air pressure passage hole 44 formed in the base body 43. The handle 46 is threadably engaged with the base body 43 in such a manner as to cause the needle valve 45 to move into and out of the air pressure passage hole 44. The base body 43 is also provided with an air relief hole 47.

Operation of this other embodiment will be explained below. When the speed-control section 1 is shifted from a low-speed position shown in FIG. 5 to a high-speed position shown in FIG. 6, the handle 46 of the discharge throttle valve 42 is turned in a direction to decrease the lift of the needle valve 45, whereupon the opening degree of the air pressure passage hole 44 is made smaller to reduce the rate of relief of air. This increases the air pressure entering the command pressure chamber 4 from the communication hole 40 and the restriction orifice 40a, thereby moving the central portion of the diaphragm 3 to the right. As a result, as in the operation of the preceding embodiment, the speed-control section 1 of the continuously variable transmission 200 is shifted into the high-speed position. Next, when the speed-change section 1 is shifted from the high-speed position shown in FIG. 6 to the low-speed position shown in FIG. 5, the handle 46 of the discharge throttle valve 42 is turned in a direction to increase the lift of the needle valve 45, whereupon the opening degree of the air pressure passage hole 44 is made larger to increase the rate of relief of air. This decreases the air pressure entering the command pressure chamber 4 through the communication hole 40 and the restriction orifice 40a, so that the central portion of the diaphragm 3 is moved to the left. As a result, as in the operation of the preceding embodiment, the speed-control section 1 of the continuously variable transmission 200 is shifted into the low-speed position.

According to this other embodiment, there is no need for providing the command air pressure source other than the working air pressure source, making it possible to provide a single air pressure supply system. This other embodiment also requires only one air pressure pipe leading from the revolution speed controller to a control place of an operator, making it possible to build the handle or operating member of the discharge throttle valve in an electric console. In addition, since the speed-control can be performed only by adjusting the opening degree of the discharge throttle valve, the resistance of the handle or the like of the discharge throttle valve to an operating force is small, with a resultant decrease in the size of the discharge throttle valve and also in the size of the console even when the console is used to control a multiplicity of continuously variable speed transmissions.

In the above embodiment, while the discharge throttle valve 42 is described as being operated by the manual handle 46, the foregoing control can be automatically performed by connecting the handle 46 of the discharge throttle valve to a dancer roller control, float control or the like via a lever. As an alternative, an electric flow control valve utilizing a shape memory alloy or the like may be utilized to control the flow rate of air entering the command pressure chamber 4.

What is claimed is:

1. A revolution speed controller for a continuously variable speed transmission, comprising:
    a pneumatic cylinder unit for operating a speed-control section of said continuously variable speed transmission;
    a command pressure chamber partially defined by a diaphragm operable in response to a command air pressure, said command pressure chamber being provided with a command air pressure supply hole to receive the command air pressure therethrough;
    a working air chamber communicating with the interior of said pneumatic cylinder unit, said working air chamber being provided with a working air supply hole to receive working air pressure for operating said pneumatic cylinder unit and with a passage for communicating said working air chamber with the atmosphere;
    a resilient member extending between said diaphragm and said pneumatic cylinder unit; and
    a valve member movable in response to operation of said diaphragm to open and close said working air supply hole and for open and close said passage, said valve member being arranged to close said working air supply hole and also close said passage when a force applied to said diaphragm by the command air pressure in said command pressure chamber is balanced with a force exerted by said resilient member to said diaphragm.

2. A revolution speed controller for a continuously variable speed transmission according to claim 1, wherein a second chamber communicating with the atmosphere is partially defined by said diaphragm and disposed on the side of said diaphragm opposite to said command pressure chamber; said passage includes a cylindrical hole for communicating said chamber with said working air chamber; a valve seat is provided on the side of said diaphragm facing said second chamber; and said valve member has holes and is slidable in said cylindrical hole, said valve member including a first valve portion to open and close said working air supply hole and a second valve portion to open and close said hole in cooperation with said valve seat.

3. A revolution speed controller for a continuously variable speed transmission according to claim 2, further including a second resilient member for biasing said valve member in one direction to urge said second valve portion toward said valve seat and also urge said first valve portion to close said working air supply hole.

4. A revolution speed controller for a continuously variable speed transmission according to claim 3, further including an adjust screw for adjusting a pressing force of said second resilient member 5. A revolution speed controller for a continuously variable speed transmission according to claim 1, wherein said pneumatic cylinder unit includes a piston and a cylinder bore; a joint pin has one end fixed to a central portion of said diaphragm and extends slidably through said piston; and first-said resilient member is interposed between the other end and said piston such that the first-said resilient member urges said piston toward said diaphragm against an air pressure in said cylinder bore.

6. A revolution speed controller for a continuously variable speed transmission according to claim 5, wherein the first-said resilient member is a compression coil spring urging said diaphragm toward said piston against the command air pressure in said command pressure chamber.

7. A revolution speed controller for a continuously variable speed transmission according to claim 1, wherein a communication hole is provided between said working air chamber and said command pressure chamber for supplying the working air pressure to said command pressure chamber, and said command air pressure supply hole is provided with a valve for adjusting the air pressure introduced into said command pressure chamber via said communication hole.

8. A revolution speed controller for a continuously variable speed transmission according to claim 7, wherein said air pressure adjusting valve comprises a base body having an air pressure passage hole disposed in communication with said command air pressure supply hole, a needle valve associated with said air pressure passage hole, a handle for moving said needle valve into and out of said air pressure passage hole, and an air release hole formed in said base body for releasing the air having passed through said air pressure passage hole to the atmosphere.

* * * * *